United States Patent [19]

Crane et al.

[11] Patent Number: 5,744,221
[45] Date of Patent: Apr. 28, 1998

[54] FLEXIBLE HIGH-DAMPING COMPOSITE STRUCTURES AND FABRICATION THEREOF

[75] Inventors: Roger M. Crane, Arnold; Armando L. Santiago, Annapolis; Wayne C. Jones, Baltimore, all of Md.

[73] Assignee: The United States of America as represented by the Secretary of the Navy, Washington, D.C.

[21] Appl. No.: 237,579

[22] Filed: May 3, 1994

Related U.S. Application Data

[63] Continuation-in-part of Ser. No. 945,041, Sep. 15, 1992, Pat. No. 5,308,675.

[51] Int. Cl.$^6$ .................................................. B32B 3/00
[52] U.S. Cl. .................... 428/196; 442/105; 242/430; 427/265; 427/288; 427/385.5; 427/389.9
[58] Field of Search ........................... 428/230, 260, 428/289, 196; 427/372.2, 265, 288, 385.5, 389.9; 156/169; 442/104, 105; 242/430

[56] References Cited

U.S. PATENT DOCUMENTS

| | | | |
|---|---|---|---|
| 3,899,623 | 8/1975 | Okazaki et al. | 428/290 |
| 4,233,359 | 11/1980 | Mimura et al. | 428/254 |
| 4,278,726 | 7/1981 | Wieme | 428/229 |
| 4,651,445 | 3/1987 | Hannibal | 36/103 |
| 4,722,717 | 2/1988 | Salzman et al. | 464/181 |
| 4,812,348 | 3/1989 | Rau | 428/113 |
| 4,863,416 | 9/1989 | Gupta | 464/181 |
| 4,919,876 | 4/1990 | Savage et al. | 264/258 |
| 4,954,377 | 9/1990 | Fischer et al. | 428/36.1 |
| 5,030,490 | 7/1991 | Bronowicki et al. | 428/36.4 |
| 5,087,491 | 2/1992 | Barrett | 428/34.5 |
| 5,108,262 | 4/1992 | Crane | 416/230 |
| 5,108,802 | 4/1992 | Sattinger | 428/34.1 |
| 5,250,132 | 10/1993 | Lapp et al. | 156/173 |
| 5,256,223 | 10/1993 | Alberts et al. | 156/71 |
| 5,261,616 | 11/1993 | Crane et al. | 242/7.22 |
| 5,503,879 | 4/1996 | Cochran | 427/389.9 |

OTHER PUBLICATIONS

Agarwal, Bhagwan D. and Broutman, Lawrence J., Analysis and Performance of Fiber Composites, 2nd Ed., J Wiley & Sons, Inc., N.Y. (1990), pp. 42–44.
Harruff, P., Tsuchiyama, T. and Spicola, F.C., "Filament Wound Torpedo Hull Structures," Fabricating Composites '86 Proceedings, Society of Manufacturing Engineers, Sep. 8–11, Baltimore, Maryland, pp. 1–18 (1986).
Report No. DTRC–PASD–CR–1–88, Contract No. N00167–86–0150, Tulpinsky, Joseph F. and May, Marvin C., "Filament Winding Process for Composite Propeller Drive Shaft Sections," Oct. '86 to Oct. '87, prepared by Hercules, Inc. for DTRC, pp. 4–1 thru 4–8 (Chapter 4.0 Manufacturing) (Oct. 1987).
Peters, S. T., Humphrey, W.D., and Foral, R. F., Filament Winding, composite Structure Fabrication, Society for the Advancement of Material and Process Engineering, Covina, California, pp. 2–9, 2–12, 11–1 to 11–3 (Date Unknown).
Libin, George, Handbook of Composites, Van Nostrand Reinhold Co., New York, (1981), Section I, Chapter 8, pp. 136–159.
Becker, Wayne and Wadsworth, Mark, "Resin Transfer Molding: Principles for Success," Resin Transfer Molding for the Aerospace Industry, Mar. 6–7 (1990), sponsored by the Society of Manufacturing Engineers Continuing Education for Productivity and Technological Growth (Mar. 1990).
Crane, Roger, M. and Juska, Thomas D., "Resin Transfer Molding for Composite Naval Applications," Resin Transfer Molding for the Aerospace Industry, Mar. 6–7, (1990), sponsored by the Society of Manufacturing Engineers Continuing Education for Productivity and Technological Growth (Mar. 1990).

*Primary Examiner*—Christopher Raimund
*Attorney, Agent, or Firm*—Howard Kaiser

[57] ABSTRACT

Composite structures which are cost-effectively fabricated using conventional resin transfer molding or filament winding technique, featuring utilization of fiber fabric material or individually stranded fiber tow material as the fiber reinforcement material for high strain-to-failure viscoelastic matrix material, and affording desired structural performance and superior performance in terms of flexibility, damping and damage-tolerance.

29 Claims, 4 Drawing Sheets

FLEXIBLE HIGH-DAMPING COMPOSITE STRUCTURES AND FABRICATION THEREOF

This application is a continuation-in-part of patent application Ser. No. 07/945,041 filed Sep. 15, 1992, now U.S. Pat. No. 5,308,675 issued May 3, 1994, incorporated herein by reference.

The invention described herein may be manufactured and used by or for the Government of the United States of America for governmental purposes without the payment of any royalties thereon or therefor.

BACKGROUND OF THE INVENTION

The present invention relates to composite structures, more particularly to flexible high-damping composite structures and methods of making same.

Composite materials have been used or considered for various structural applications wherein dissipation of mechanical energy and/or acoustic energy is required. Such structural applications generally utilize organic matrix composite systems which are either thermoplastic or thermoset; an organic matrix composite system is typically fabricated using high-strength fibers to carry a specific load and a matrix material. Organic matrix composite systems offer some inherent damping properties because of their viscoelastic characteristic.

Because of the strain-to-failure of the matrix, the strain-to-failure of an organic matrix composite system is normally less than 20%, typically around 10% or less. The matrix material serves to keep the fibers aligned and to transfer the load between the fibers. Selection of the matrix material for structural applications is normally based upon the elastic modulus and strength of the matrix material.

Composite materials in general are seeing increased usage in structural applications. The forms of such structures may be viewed as falling into either of two categories, viz., (1) axisymmetric sections (such as cylinders) and (2) uniform thickness sections (such as flat plates or such sections having curvatures). Examples which have been seen in axisymmetric applications include torpedo hull bodies, UUV hulls, pipe couplings, cylindrical crush tubes and submarine structures. Examples of uniform thickness applications which have been practiced include structural flanges, coatings over airfoil shapes, beam sections and bumpers. In all cases, these structures are principally designed to support a predefined load in order to achieve the necessary structural performance.

In addition to their structural performance, these applications typically operate in a hostile environment, frequently being subjected to impact loading which has been shown to cause substantial degradation to integrity and mechanical properties of the conventional composite parts. One material form which has shown significant promise for damage tolerant design includes a multidimensionally braided fiber preform impregnated with a high strain-to-failure matrix system.

U.S. Pat. No. 4,954,377 to Fischer and Crane, incorporated herein by reference, and U.S. Pat. No. 5,108,262 to Crane, incorporated herein by reference, disclose utilization of highly viscoelastic matrix materials in conjunction with multidimensionally braided fiber preforms. Implicit in these teachings is the assumption in the art that this particular fiber preform configuration is required in order to support desired loadings.

Although multidimensionally braided fiber preforms have achieved quite satisfactory results in various applications, such preforms are expensive and labor-intensive to manufacture. Moreover, the process of infiltrating the multidimensionally braided fiber preforms with highly viscoelastic matrix material involves application of resin transfer molding technique. Multidimensionally braided fiber preforms do not lend themselves to being infiltrated with the highly viscoelastic matrix material by another, less expensive process, such as filament winding.

Filament winding is a technique which is known in the art for the manufacture of cylindrical structures (e.g., tubes and pipes), spherical structures, and other surfaces of revolution. Typically, the filament winding process involves utilization of a resin bath through which dry fibers are passed and then wound; this type of filament winding is known as "wet winding." In this technique the wind angle, band width and tow tension are controlled. Alternatively, the filament winding process typically utilizes prepreg tape in favor of wet winding technique in order to achieve tighter control on fabricated properties. The filament winding art has conventionally utilized, for structural applications, fibers having appropriate strength characteristics (e.g., glass or carbon fibers) in conjunction with a conventional (e.g. epoxy) resin matrix.

The multiple-rib cylinder assembly disclosed by Crane and Bergen U.S. Pat. No. 5,261,616 is incorporated herein by reference. Crane and Bergen U.S. Pat. No. 5,261,616 disclose a multiple-layered, translatedly rib-stiffened, composite hollow cylinder and a method for fabrication thereof which utilizes filament winding techniques known in the art.

Also incorporated herein by reference are the following: Agarwal, Bhagwan D., and Broutman, Lawrence J., Analysis and Performance of Fiber Composites, 2nd Ed., John Wiley & Sons, Inc., New York, 1990, section 2.3.1.3 "Filament Winding," pp. 42–44); Harruff, P., Tsuchiyama T., and Spicola, F. C., "Filament Wound Torpedo Hull Structures," Fabricating Composites '86 Proceedings, Society of Manufacturing Engineers, Sep. 8–11, 1986, Baltimore, Md., pages 1–18; Report No. DTRC-PASD-CR-1-88, Contract No. N00167-86-C-0150, Tulpinsky, Joseph F., and May, Marvin C., "Filament Winding Process for Composite Propeller Drive Shaft Sections," October 1986 to October 1987, prepared by Hercules, Inc. for David Taylor Naval Ship R & D Center, pages 4-1 through 4-8 of Chapter 4.0 (entitled "Manufacturing"); Peters, S. T., Humphrey, W. D., and Foral, R. F., Filament Winding, Composite Structure Fabrication, Society for the Advancement of Material and Process Engineering, Covina, Calif., 1991, pages 2-9, 2-12, 11-1 to 11-3.

Fisher and Crane U.S. Pat. No. 4,954,377 and Crane U.S. Pat. No. 5,108,262 demonstrate the ability, via resin transfer molding, to readily infiltrate fiber preforms which are multidimensionally braided fiber preforms with liquid resin which is high strain-to-failure viscoelastic material.

Resin transfer molding is a process known in the art whereby liquid resin is infused into a dry fiber preform while in a closed mold. The resin hardens while in the mold, permanently trapping the fibers in desired register. As advancements have been made in instrumentation, reinforcement fibers and resins, resin transfer molding has been increasingly considered for various structural applications. Of interest in this regard is Resin Transfer Molding for the Aerospace Industry, sponsored by the Society of Manufacturing Engineers Continuing Education for Productivity and Technological Growth, Mar. 6–7, 1990, Radisson Plaza Hotel, Manhattan Beach (Los Angeles), Calif.; see, e.g., Becker, Wayne and Wadsworth, Mark, "Resin Transfer Molding: Principles for Success," pages 1–33, incorporated herein by reference.

SUMMARY OF THE INVENTION

In view of the foregoing, it is an object of the present invention to provide composite structures which are flexible, high-damping and damage-tolerant, and methods of making such composite structures.

It is a further object of this invention to provide such composite structures and methods which can meet specific structural requirements in terms of compression, bending or torsional loading.

Another object of this invention is to provide such composite structures and methods which are more cost-effective than similar structures and concomitant methods which involve multidimensionally braided fiber preforms.

Aforementioned Crane and Coffin U.S. Pat. No. 5,308,675 issued May 3, 1994, of which this is a continuation-in-part, discloses (col. 7, lines 41–46) that high strain-to-failure viscoelastic material is viscoelastic material having a strain-to-failure greater than 60%.

Fisher and Crane U.S. Pat. No. 4,954,377 and Crane U.S. Pat. No. 5,108,262 disclose utilization of high strain-to-failure viscoelastic matrix material instead of a conventional matrix material as the matrix material which combines with multidimensionally braided fiber reinforcement material for purposes of making their respective structures. Fisher and Crane U.S. Pat. No. 4,954,377 disclose utilization of a highly viscoleastic material such as for example, butyl or nitrile rubber or any other highly viscoelastic material that exhibits molecular interaction when subjected to shearing forces. Fisher and Crane U.S. Pat. No. 4,954,377 disclose that the general characteristics of the viscoelastic material in the cured condition are such as exhibit a capacity to withstand a high strain to failure and a high damping loss factor. Crane U.S. Pat. No. 5,108,262 discloses utilization of a highly viscoelastic matrix material as, urethane, polyurethane, nitrile rubber, or other such material having a high vibration damping loss factor. Analogously, the present invention utilizes a high strain-to-failure viscoelastic matrix material (such as polyurethane) instead of a conventional matrix material (such as epoxy) as the matrix material which combines with conventional fabric fiber reinforcement material or single-stranded tow fiber reinforcement material for purposes of making high-damping, damage-tolerant composite structures.

Featured by the present invention is utilization of conventional fabric material or single-stranded tow material, in lieu of the multidimensionally braided fiber material taught by Fisher and Crane U.S. Pat. No. 4,954,377 and Crane U.S. Pat. No. 5,108,262, as the fiber reinforcement material which combines with the high strain-to-failure viscoelastic material.

In accordance with this invention, conventional resin transfer molding techniques are utilized for both structures with axis of symmetry as well as for uniform thickness flat plate-type forms; wet filament winding is utilized for structures with axis of symmetry. Resin transfer molding is utilized for embodiments wherein the fiber reinforcement material is fabric material; wet filament winding is utilized for embodiments wherein the fiber reinforcement material is single-stranded tows.

For embodiments wherein the fiber reinforcement material is fabric material, the present invention provides a flexible, high-damping, damage-tolerant composite structure comprising fabric material having a plurality of fibers and high strain-to-failure viscoelastic matrix material contiguously disposed in relation to at least some of the fibers. Also provided by the present invention is a method for making a flexible, high-damping, damage-tolerant composite structure, comprising preparing fabric material having a plurality of fibers, and infusing at least some of the fabric material with high strain-to-failure viscoelastic matrix material.

For embodiments wherein the fiber reinforcement material is single-stranded tows, the present invention provides a flexible, high-damping, damage-tolerant composite structure comprising a plurality of single-stranded tows and high strain-to-failure viscoelastic matrix material contiguously disposed in relation to at least some of the tows. Also provided by the present invention is a method for making a flexible, high-damping, damage-tolerant composite structure, comprising preparing a bath containing high strain-to-failure viscoelastic matrix material, and wet winding a plurality of single-stranded tows through the bath.

The structural composite form in accordance with this invention provides significant improvements in terms of damage tolerance, damping and enhanced shock capability. The enhanced shock capability derives from the strain characteristic of the matrix insofar as reacting to the load over a longer period of time, thereby reducing the peak load experienced by the structure.

The composite structures according to this invention are lightweight and corrosion-resistant. These structures are made using commercially available material constituents and processing procedures which are typically utilized for fabricating composites.

Although multidimensionally braided fiber preforms have achieved superior results, such preforms are limited to applications utilizing conventional resin transfer molding for fabricating uniform thickness flat plate-type forms. Manufacture of multidimensionally braided fiber preforms is expensive, involving extensive labor.

Wet filament winding, on the other hand, is a process which is used for fabricating axis-of-symmetry forms and which has a greatly reduced cost associated therewith. Moreover, the fiber tow material used for the wet filament winding process is considerably less expensive than multidimensionally braided fiber material. Furthermore, wet winding of fiber tows can achieve a desired thickness for a composite structural form not only much more cost-effectively but also much more quickly than can resin transfer molding technique applied to multidimensionally braided fiber preforms. As for wet winding with high strain-to-failure viscoelastic matrix material, it is well within the purview of the ordinarily skilled artisan to select specific high strain-to-failure (e.g., polyurethane) matrix systems having viscosity which can be kept relatively low for extended periods of time.

Simultaneous preferential infiltration in accordance with the present invention allows for customization of strain characteristics within one structural piece in order to meet, without secondary processing, requirements pertaining to damage tolerance, damping and structure.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawing, wherein like numbers indicate the same or similar components, and wherein.

DETAILED DESCRIPTION OF THE INVENTION

Figure 1:
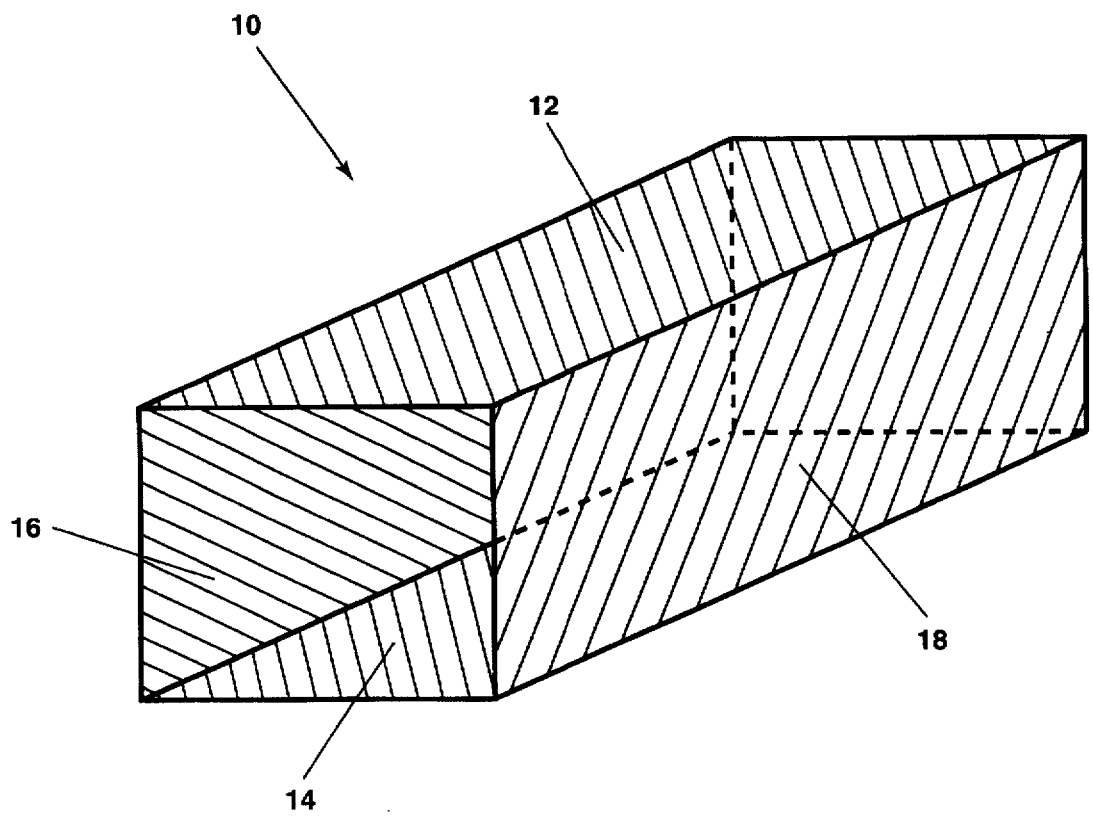
FIG. 1 is a diagrammatic perspective view of a box beam in accordance with the present invention.

Fiber tows according to this invention are individually stranded, each tow being multi-fibered or uni-fibered. For most embodiments structural considerations require that each tow preferably have a plurality of fibers which are twisted together or otherwise engaged, although uni-fiber tows may be used in practicing this invention.

"Fabric" as used herein is as conventionally understood, viz., any cloth-like material entity which is formed by weaving, knitting, knotting, felting and/or matting of fibers; in other words, the fibers of a fabric are integrally interrelated "in fabric form." "Fabric material" as used herein is material comprising one or more fabrics.

In accordance with this invention, a fabric can have fibers of either uniform or diverse fiber types. The fibers of a fabric can be natural or synthetic or some combination thereof. Moreover, two or more fabrics of either uniform or diverse fabric types can comprise the fabric material which is utilized for practicing various embodiments of this invention.

Practice of the present invention most often preferably utilizes fabric material of appropriate strength for structural applications, generally referred to by manufacturers as "reinforcing fabric material." Among the common categories of such material is fiberglass fabric reinforcement, which is readily available as fiberglass fabric, woven or matted in various forms; incorporated herein by reference is Lubin, George, *Handbook of Composites*, Van Nostrand Reinhold Company, New York, 1981, section I (entitled "Raw Materials"), chapter 8 (entitled "Fiberglass Reinforcement"); see, esp., subsection 8.5 (entitled "Fiberglass Forms"), pages 141–149.

Fabric material is distinguishable from the multidimensionally braided fiber material which is disclosed by Fisher and Crane U.S. Pat. No. 4,954,377 and Crane U.S. Pat. No. 5,108,262. The fibers of the multidimensionally braided fiber material traverse through the thickness of the preform and in multitudinous directions in three dimensions; the resultant preform is an integral system of a specific predetermined shape having thickness, width and length. Fabrics are planar, or virtually so, albeit that fibers therein may be found in different directions in two dimensions, i.e., within the fabric plane.

The ordinarily skilled artisan is well acquainted with the kinds and characteristics of fiber reinforcing materials which are conventionally or appropriately used for various structural applications. For example, glass fibers, generally speaking, are more flexible and less expensive than carbon fibers. In accordance with the present invention, the fiber reinforcing material, whether in the form of fabric material or tows, can be but is not limited to fiber reinforcing material in any combination among any of the following categories thereof, well known to the ordinarily skilled artisan: glass fiber; carbon fiber (e.g., graphite fiber); polymer-based fiber (e.g., that which is sold under the trade names kevlar and spectra, kevlar being an aramid); quartz fiber; ceramic fiber (e.g., silicon carbide fiber); metallic fiber (e.g., aluminum fiber). Natural fibers such as silk or cotton or polymer-based fibers such as nylon or rayon are not conventionally used as fiber reinforcing material for structural applications; nevertheless, any fiber reinforcing material known to man can be used in accordance with the present invention, so long as that fiber reinforcing material is appropriate for a given structural application.

The U.S. Navy has reduced the present invention to practice in "box beam" and "flange" structural forms, using glass fiber reinforcing material with a resin transfer molding process, as well as in "stanchion" structural form, using glass tow reinforcing material with a filament winding technique. Each structure was made having a fiber content greater than about 55% by volume. In practice of this invention structural considerations for most embodiments require that the composite structure have a fiber content of at least about 50% by volume.

In reducing this invention to practice the U.S. Navy actually used a polyurethane/urea matrix system as the high strain-to-failure viscoelastic matrix material. The polyurethane/urea matrix system was formulated with a blocked cure system to allow very long pot life. The polyurethane/urea matrix system was selected by the U.S. Navy for reasons of process development, but conventional polyurethanes would likely provide cost advantages in a manufacturing environment.

The term "polyurethane" as used herein is as conventionally understood, except that it should also be understood that the term "polyurethane" means "polyurethane/urea" to describe the high strain-to-failure viscoelastic matrix material in those contexts of the discussion herein wherein the U.S. Navy has reduced the present invention to practice. It should be emphasized that it is well within the scope of skill of the ordinarily skilled artisan to select the high strain-to-failure viscoelastic matrix material, whether it be polyurethane or polyurethane/urea or another high strain-to-failure viscoelastic matrix material, any of which may be appropriate or preferable for a particular embodiment in practicing the present invention; use herein of the term "polyurethane" in the following examples should not be taken to suggest that there are not embodiments in practicing the present invention for which high strain-to-failure viscoelastic matrix material other than polyurethane is appropriately or preferably utilized.

EXAMPLE 1

Referring now to FIG. 1, box beam 10 has top face 12, bottom face 14, left side face 16 and right side face 18. Each of the four faces 12, 14, 16 and 18 is a fiber/polyurethane face.

Box beam 10 has been fabricated by resin transfer molding technique whereby fiberglass fabric material is wrapped over a mandrel followed by resin transfer molding with polyurethane.

Alternatively, box beam 10 can be fabricated by wet filament winding process whereby a heated bath is used to wet wind fiberglass tows with polyurethane.

EXAMPLE 2

Figure 2:
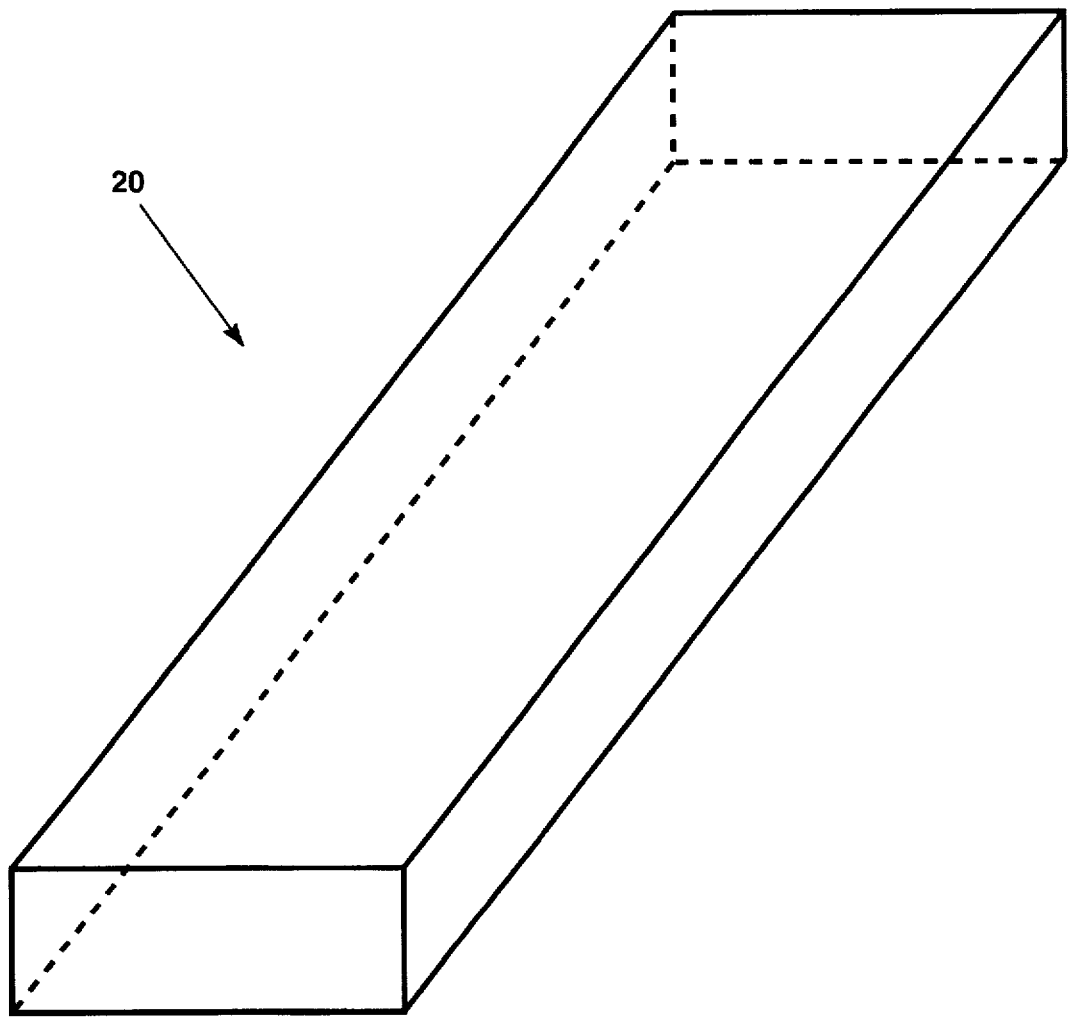
FIG. 2 is a diagrammatic perspective view of a flange in accordance with the present invention.

With reference to FIG. 2, flange 20 utilizes both glass and graphite fabrics impregnated with a polyurethane matrix. Tests conducted on flange 20 have demonstrated the tremendous flexibility that can be achieved with this material combination.

Impregnation has been accomplished using a vacuum-and-pressure resin transfer technique followed by compression molding. This combination of processing has allowed for varying the fiber content from about 50% to as high as about 70% by volume.

EXAMPLE 3

For some embodiments of the present invention it is preferable that the fabric material be selectively infiltrated with varying matrix systems at different locations of the composite structure. For example, the fiber material can be infiltrated in one or more locations with a conventional matrix system (i.e., a matrix system which is not a high strain-to-failure viscoelastic matrix material) such as epoxy and infiltrated in one or more other locations requiring greater damage tolerance or damping with a high strain-to-failure viscoelastic matrix material such as polyurethane.

Conventional matrix resin materials include epoxy, urea, polyester, vinylester, phenolic, polyimide, bismaleimide, melamine and silicone.

Figure 3:
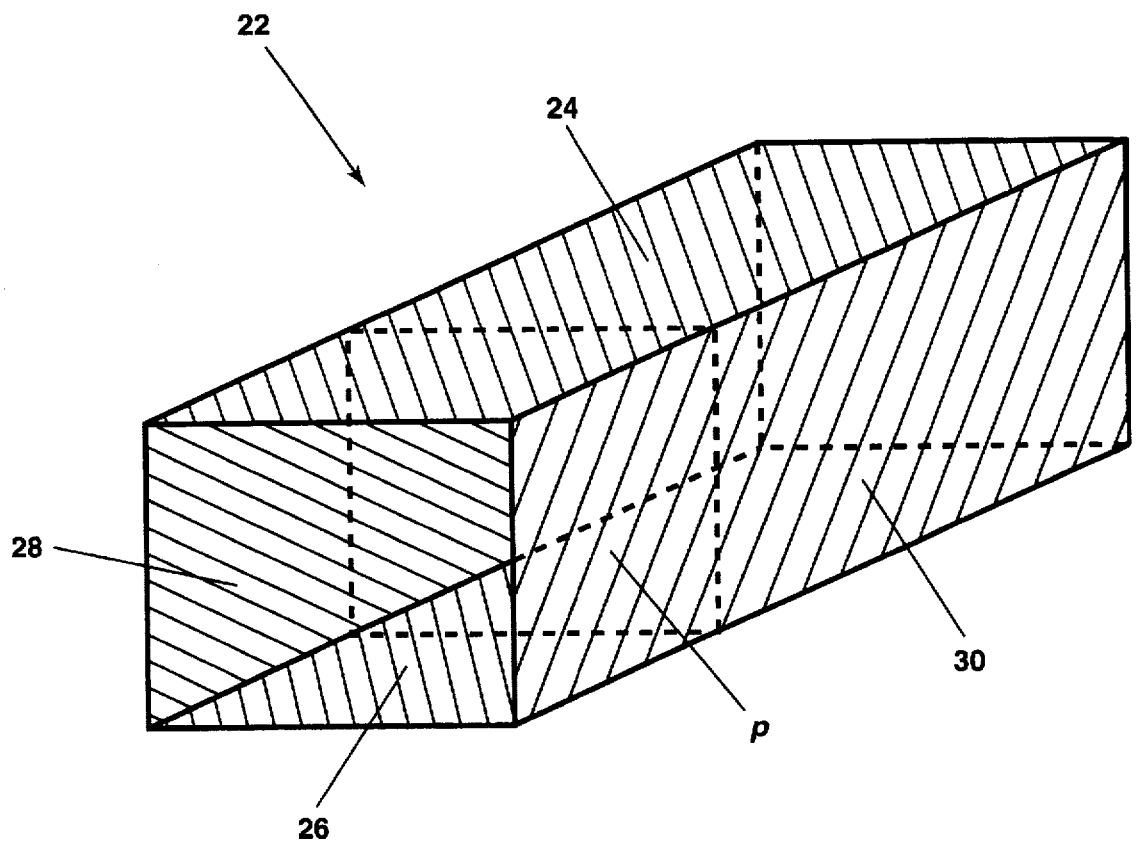
FIG. 3 is a view similar to that in FIG. 1, wherein the box beam has preferential infiltration of matrices using conventional resin material and high strain-to-failure viscoelastic material, in accordance with the present invention.

Reference now being made to FIG. 3, preferentially infiltrated box beam 22 has top face 24, bottom face 26, left side face 28 and right side face 30. Each of the three faces 26, 28 and 30 is a fiber/epoxy face. Top face 24 is a fiber/polyurethane face. Qualitative tests performed on preferentially infiltrated box beam 22 have demonstrated the tremendous damage tolerance of this composite structural form, as well as significant damping without any secondary processing, as is normally the case when viscoelastic damping material is added to a structure.

Preferentially infiltrated box beam 22 has been fabricated by resin transfer molding technique whereby fiberglass fabric material is wrapped over a mandrel followed by resin transfer molding of three faces with epoxy and the fourth face with polyurethane. Bottom face 26, left side face 28 and right side face 30 have been infiltrated with epoxy and top face 24 has been infiltrated with polyurethane.

Preferentially infiltrated box beam 22 is a hybrid composite structural form comprising one fiber system and two matrix systems. This mode of hybridity in a composite structure differs markedly from the conventional notion of hybridity in a composite structure, viz., a hybrid composite structural form comprising one matrix system and two or more fiber systems.

With regard to preferential infiltration of matrices, any practicable combinational and locational variation of fiber systems and matrix systems can be practiced in accordance with the present invention. For example, preferentially infiltrated box beam 22 can have: one fiber/high-strain-to-failure-viscoelastic face (e.g., face 24) and three fiber/conventional-resin faces (e.g., faces 26, 28 and 30), as described above in Example 3; or, two fiber/high-strain-to-failure-viscoelastic faces (e.g., faces 24 and 26) and two fiber/conventional-resin faces (e.g., fails 28 and 30); or, three fiber/high-strain-to-failure-viscoelastic faces (e.g., faces 24, 28 and 30) and one fiber/conventional-resin face (e.g., face 26). Of course, all four faces can be fiber/high-strain-to-failure-viscoelastic faces, as seen for box beam 10 in Example 1, above. As for the fabric material, faces 24, 26, 28 and 30 can have any combination of commonality or distinctness among them in terms of their respective fiber systems.

Preferential infiltration of matrices can alternatively be accomplished utilizing wet filament winding method. Wet winding may be preferred for embodiments wherein fiber-reinforced conventional resin composite material and fiber-reinforced high-strain-to-failure viscoelastic composite material are desired at different locations along the longitudinal axis of axis-of-symmetry composite structural forms. For example, imaginary plane p in FIG. 3 illustrates the demarcation between two discrete box beam portions for such an embodiment; one box beam portion would have fiber/conventional resin on portions of all four faces and the other, longitudinally adjacent box beam portion would have fiber/high-strain-to-failure material on the remaining portions of all four faces.

EXAMPLE 4

A hybrid composite structural form of yet a different kind can be fabricated in accordance with the present invention. This mode of hybridity in a composite structure, also distinguishable from the conventional notion of hybridity in a composite structure, entails the hybrid combination of two heterogeneous material forms, one of which is fiber-reinforced high strain-to-failure viscoelastic matrix material in accordance with this invention and the other of which is some other material form (preferably a conventional composite material or a metallic material for most structural applications).

For many such embodiments this hybrid composite structural form preferably has a monolithic section of conventional composite material (such as glass or graphite epoxy) which is subsequently coated by wet filament winding or secondary flat plate-type resin transfer molding technique, with the fabric or tow impregnated with high-strain-to-failure-viscoelastic material (such as polyurethane).

Figure 4:
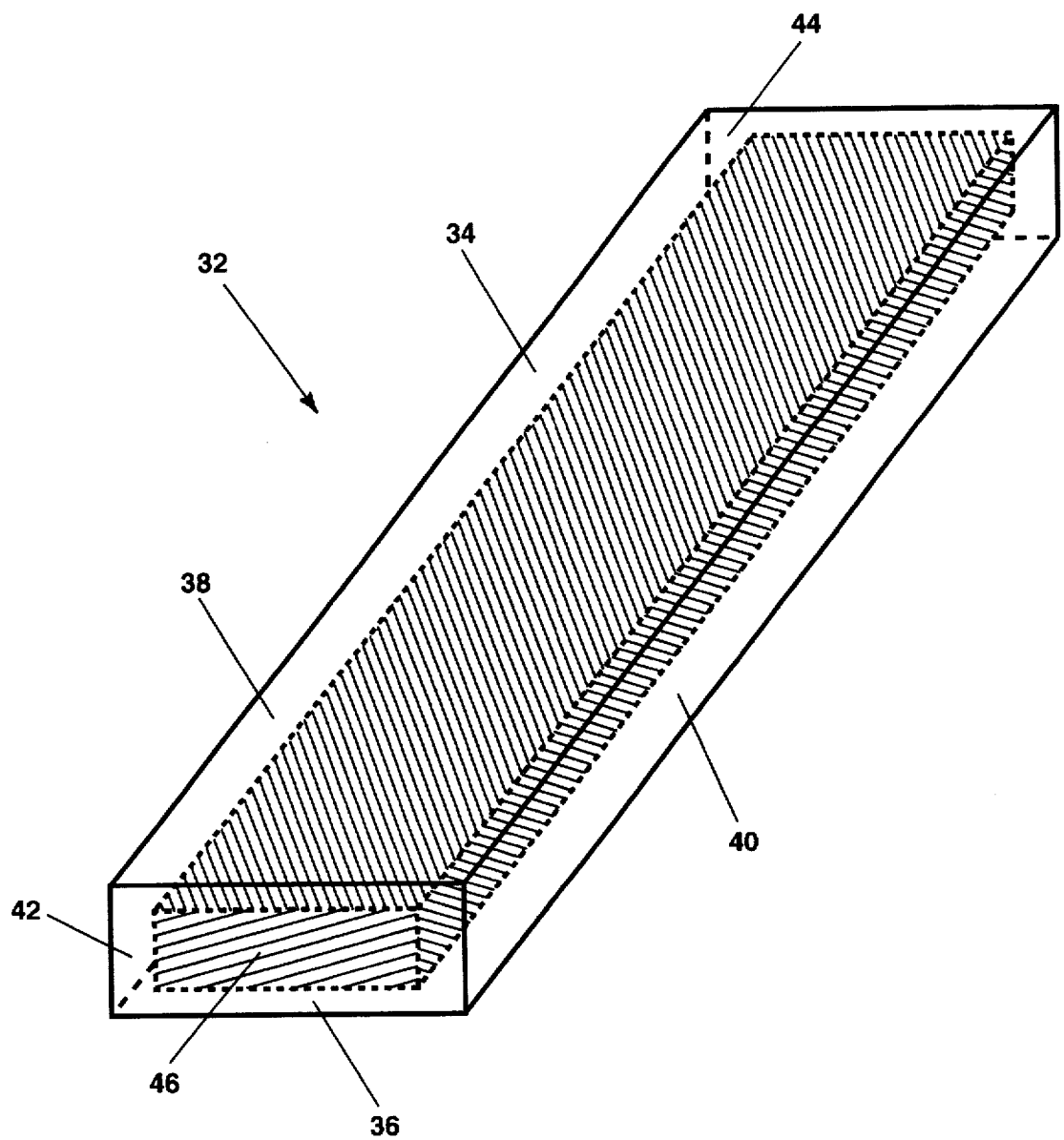
FIG. 4 is a view similar to that in FIG. 2, wherein the flange has a monolithic section of conventional composite material which is coated with fabric or tow impregnated with high strain-to-failure viscoelastic material, in accordance with the present invention.

For example, now referring to FIG. 4, heterogeneous flange 32 has top face 34, bottom face 36, left side 38, right side face 40, front end face 42 and back end face 44. At the core of heterogeneous flange 32 is glass epoxy monolithic section 46.

Heterogeneous flange 32 can be fabricated by resin transfer molding technique whereby fiberglass fabric material is wrapped over monolithic section 46, which effectively serves as the mandrel, followed by resin transfer molding with polyurethane. Each of faces 34, 36, 38 and 40 is a fiber/polyurethane face.

Alternatively, heterogeneous flange 32 can be fabricated by wet filament winding process, with monolithic section 46 effectively serving as the mandrel, whereby a heated bath is used to wet wind fiberglass tows with polyurethane. Again, each of faces 34, 36, 38 and 40 is a fiber/polyurethane face.

Regardless of whether faces 34, 36, 38 and 40 have been coated via wet filament winding or resin transfer molding, for embodiments wherein coating of end faces 42 and 44 is desired, this can be accomplished using a vacuum-and-pressure resin transfer technique followed by compression molding. Heterogeneous flange 32 which has been coated at faces 34, 36, 38 and 40 via wet filament winding and coated at faces 42 and 44 via resin transfer molding is one of many possible embodiments in accordance with this invention illustrating utilization of both wet filament winding and resin transfer molding for fabrication of the same composite structure.

For some embodiments of this invention the composite structure will be both heterogeneous and preferentially infiltrated, i.e., combining the principles of Examples 3 and 4, above. For example, heterogeneous flange 32 can be fabricated by resin transfer molding technique whereby fabric material is wrapped over monolithic section 46, followed by resin transfer molding with polyurethane on one face (e.g., face 34) and epoxy on the other three faces (e.g., faces 36, 38 and 40).

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A composite structure, comprising:
    fabric material having a plurality of fibers which are integrally interrelated in the form of said fabric material;
    high strain-to-failure viscoelastic matrix material contiguously disposed in relation to some said fibers; and
    conventional matrix material contiguously disposed in relation to other said fibers, said conventional matrix material being selected from the group of resins consisting of epoxy, urea, polyester, vinylester, phenolic, polyimide, bismaleimide, melamine and silicone.

2. A composite structure as in claim 1, further comprising:
    a plurality of single-stranded tows; and
    high strain-to-failure viscoelastic matrix material contiguously disposed in relation to at least some said tows.

3. A composite structure as in claim 1, wherein said high strain-to-failure viscoelastic matrix material is a material selected from the group consisting of polyurethane and polyurethane/urea.

4. A composite structure as in claim 1, further comprising at least one monolithic section made of material which is not fiber-reinforced matrix material.

5. A composite structure as in claim 4, wherein said material which is not fiber-reinforced matrix material is selected from the group consisting of composite material and metallic material.

6. A composite structure as in claim 1, further comprising at least one monolithic section made of material which is not fiber-reinforced matrix material.

7. A composite structure as in claim 6, wherein said material which is not fiber-reinforced matrix material is selected from the group consisting of composite material and metallic material.

8. A composite structure as in claim 1, wherein said conventional matrix material is epoxy.

9. A composite structure, comprising:
    a plurality of single-stranded tows;
    high strain-to-failure viscoelastic matrix material contiguously disposed in relation to some said tows; and
    conventional matrix material contiguously disposed in relation to other said tows, said conventional matrix material being selected from the group of resins consisting of epoxy, urea, polyester, vinylester, phenolic, polyimide, bismaleimide, melamine and silicone.

10. A composite structure as in claim 9, further comprising at least one monolithic section made of material which is not fiber-reinforced matrix material.

11. A composite structure as in claim 10, wherein said material which is not fiber-reinforced matrix material is selected from the group consisting of composite material and metallic material.

12. A composite structure as in claim 9, wherein said high strain-to-failure viscoelastic matrix material is a material selected from the group consisting of polyurethane and polyurethane/urea.

13. A composite structure as in claim 12, further comprising at least one monolithic section made of material which is not fiber-reinforced matrix material.

14. A composite structure as in claim 13, wherein said material which is not fiber-reinforced matrix material is selected from the group consisting of composite material and metallic material.

15. A composite structure as in claim 12, wherein said conventional matrix material is epoxy.

16. A composite structure as in claim 9, further comprising:
    fabric material having a plurality of fibers;
    conventional matrix material contiguously disposed in relation to at least some said fibers, said conventional matrix material being selected from the group of resins consisting of epoxy, urea, polyester, vinylester, phenolic, polyimide, bismaleimide, melamine and silicone.

17. A method for making a composite structure, comprising:
    (a) preparing fabric material having a plurality of fibers which are integrally interrelated in the form of said fabric material;
    (b) infusing at least some said fabric material with high strain-to-failure viscoelastic matrix material;
    (c) preparing a bath containing high strain-to-failure viscoelastic matrix material; and
    (d) wet winding a plurality of single-stranded tows through said bath;
    wherein said steps (a) and (b) are directed to making at least a first portion of said composite structure, and said steps (c) and (d) are directed to making at least a second portion of said composite structure.

18. A method for making a composite structure as in claim 17, wherein said high strain-to-failure viscoelastic matrix material is a material selected from the group consisting of polyurethane and polyurethane/urea.

19. A method for making a composite structure, comprising:
    preparing fabric material having a plurality of fibers which are integrally interrelated in the form of said fabric material;
    infusing some said fabric material with high strain-to-failure viscoelastic matrix material; and
    infusing other said fabric material with conventional matrix material, said conventional matrix material being selected from the group of resins consisting of epoxy, urea, polyester, vinylester, phenolic, polyimide, bismaleimide, melamine and silicone.

20. A method for making a composite structure as in claim 19, wherein said conventional matrix material is epoxy.

21. A method for making a composite structure as in claim 19, wherein said high strain-to-failure viscoelastic matrix material is a material selected from the group consisting of polyurethane and polyurethane/urea.

22. A method for making a composite structure, comprising:
    preparing a bath containing high strain-to-failure viscoelastic matrix material;
    wet winding a plurality of single-stranded tows through said bath containing high strain-to-failure viscoelastic matrix material;

preparing a bath containing conventional matrix material, said conventional matrix material being selected from the group of resins consisting of epoxy, urea, polyester, vinylester, phenolic, polyimide, bismaleimide, melamine and silicone; and wet winding a plurality of single-stranded tows through said bath containing conventional matrix material.

23. A method for making a composite structure as in claim 22, wherein said high strain-to-failure viscoelastic matrix material is a material selected from the group consisting of polyurethane and polyurethane/urea.

24. A method for making a composite structure as in claim 23, wherein said conventional matrix material is epoxy.

25. A method for making a composite structure as in claim 22, wherein said steps in claim 22 are directed to making at least a first portion of said composite structure, and further comprising the following steps directed to making at least a second portion of said composite structure:

preparing fabric material having a plurality of fibers; and infusing at least some said fabric material with conventional matrix material, said conventional matrix material being selected from the group of resins consisting of epoxy, urea, polyester, vinylester, phenolic, polyimide, bismaleimide, melamine and silicone.

26. A composite structure, comprising:

fabric material having a plurality of fibers which are integrally interrelated in the form of said fabric material;

high strain-to-failure viscoelastic matrix material contiguously disposed in relation to at least some said fibers;

a plurality of single-stranded tows; and conventional matrix material contiguously disposed in relation to at least some said tows, said conventional matrix material being selected from the group of resins consisting of epoxy, urea, polyester, vinylester, phenolic, polyimide, bismaleimide, melamine and silicone.

27. A composite structure as in claim 26, wherein said high strain-to-failure viscoelastic matrix material is a material selected from the group consisting of polyurethane and polyurethane/urea.

28. A method for making a composite structure, comprising:

(a) preparing fabric material having a plurality of fibers which are integrally interrelated in the form of said fabric material;

(b) infusing at least some said fabric material with high strain-to-failure viscoelastic matrix material;

(c) preparing a bath containing conventional matrix material, said conventional matrix material being selected from the group of resins consisting of epoxy, urea, polyester, vinylester, phenolic, polyimide, bismaleimide, melamine and silicone; and (d) wet winding a plurality of single-stranded tows through said bath;

wherein said steps (a) and (b) are directed to making at least a first portion of said composite structure, and said steps (c) and (d) are directed to making at least a second portion of said composite structure.

29. A method for making a composite structure as in claim 28, wherein said high strain-to-failure viscoelastic matrix material is a material selected from the group consisting of polyurethane and polyurethane/urea.

* * * * *